United States Patent [19]

Wiener

[11] Patent Number: 4,991,353

[45] Date of Patent: Feb. 12, 1991

[54] GRINDING MACHINE FOR GRINDING PREGEARED BEVEL GEARS

[76] Inventor: Dieter Wiener, Tulpenstrasse 9, D-7505 Ettlingen, Fed. Rep. of Germany

[21] Appl. No.: 761,077

[22] Filed: Jul. 31, 1985

Related U.S. Application Data

[62] Division of Ser. No. 617,523, Jun. 4, 1984.

[30] Foreign Application Priority Data

Jun. 3, 1983 [DE] Fed. Rep. of Germany ....... 3320042

[51] Int. Cl.$^5$ .............................................. B24B 7/00
[52] U.S. Cl. ................................... 51/5 D; 51/165.77; 51/165.87
[58] Field of Search ................... 51/5 D, 33 R, 33 W, 51/35, 52 R, 52 H, 56.6, 90, 95.6 H, 105 HB, 105.66, 165.77, 165.87, 287

[56] References Cited

U.S. PATENT DOCUMENTS

| | | | |
|---|---|---|---|
| 3,213,567 | 10/1965 | King et al. | 51/5 D |
| 3,553,892 | 1/1971 | Sommer | 51/5 D |
| 3,553,893 | 1/1971 | Stade | 51/287 X |
| 3,974,595 | 8/1976 | Wolf et al. | 51/5 D |
| 4,151,684 | 5/1979 | Wada et al. | 51/5 D |
| 4,170,091 | 10/1979 | Ellwanger et al. | 51/5 D |
| 4,378,660 | 4/1983 | Wiener | 51/56 G |
| 4,450,651 | 5/1984 | Reda et al. | 51/5 D |

Primary Examiner—Frederick R. Schmidt
Assistant Examiner—M. Rachuba
Attorney, Agent, or Firm—Antonelli, Terry, Stout & Kraus

[57] ABSTRACT

A machine for grinding pregeared bevel gears in which the grinding of both flanks of the tooth gap is performed in a single setting and by a single tool in a hobbing process. The grinding machine is provided with a truing device rigidly connected to a stationary part of the machine, and a truing tool is pivotable relative to the grinding wheel to adjust an angle of engagement therebetween. An oscillating movement is imparted to the grinding head carrying the grinding wheel radially relative to the bevel gear being ground and a compensating movement in the direction perpendicular to the oscillating movement is also imparted to the grinding wheel, whereby the grinding of the pregeared bevel gears of any profiles is possible.

11 Claims, 7 Drawing Sheets

GRINDING MACHINE FOR GRINDING PREGEARED BEVEL GEARS

This is a division of application Ser. No. 617,523, filed June 4, 1984.

BACKGROUND OF THE INVENTION

The present invention relates to a method and machine for grinding pregeared bevel gears.

Grinding machines for grinding bevel gears which have circularly shaped tooth flanks have been known. Such tooth surfaces of bevel gears have been ground with the aid of an elliptical additional movement imparted to the grinding head, as has been disclosed, for example in German patent publication No. P 29 45 483.9-14. Other tooth surface shapes have been also ground by the known machines. This elliptical additional movement is performed in a very quick operation which is important in mass production.

In other known methods of grinding tooth profiles of pregeared bevel gears two flanks of only disc-shaped gears have been ground in one setting of the grinding tool whereas for grinding bevel gears two different working operations have been required, or it has been necessary to employ grinding wheels with coatings for the wheel and the counterwheel unless a special construction of the bevel gear toothing required the grinding of both flanks of each tooth in one setting with the crown grinding wheel. This last method, however, strongly limits the possiblities of grinding of the toothing.

The present invention relates to a machine for grinding pregeared bevel gears in one setting at the right-hand and the left-hand flanks by a single tool.

Grinding machines of the aforementioned type have been proposed in, for example, Offenlegungsschrifts Nos. 2,721,164 and 2,945,483.

During the manufacturing of toothed bevel gears in a hobbing process, the workpiece is usually secured to the spindle of the workpiece carrier while the grinding wheel is received on the hob member of the tool carrier. The grinding wheel and the workpiece are applied to each other in the known hobbing motion by which the tooth shape in the direction of the tooth depth is generated. The grinding wheel defines the tooth shape in the direction of elongation of the tooth. The cutting motion of the grinding wheel causes a material removal in the known fashion. The eccentricity between the grinding spindle and the central axis of the machine causes a desired angle of the tooth. If a radial displacement "e" is imparted to the grinding wheel the above eccentricity is adjusted to that displacement in order to produce a combination of the tool radii and the angle of the tooth in the correct manner. The "radial" displacement can be varied for the right-hand flank and the left-hand flank of the tooth, whereby the displacements of the carrier from the inner end of the tooth to the outer end of the tooth and in the opposite direction can be made independent from each other. The hobbing movement as well as all secondary movements of the tool grinding wheel are numerically controlled so that a mechanical transmission for coordinating all these motions can be omitted. The balancing rotation required to produce a correct tooth gap, can be also provided by a numerical control of the machine. If the eccentricity is introduced in the multiple control of the machine the "radial" displacement of the grinding wheel can be executed with a high precision and in a very short period of time during the change from the forward hobbing to the backward hobbing.

Furthermore, the grinding tool, that is, a grinding wheel, and up the radial movement of the grinding tool may be moved toward the truing device and thereby a radius of the grinding wheel is determined.

By virtue of the "radial" displacement, the grinding wheel can be moved toward the truing roller so that the radius of the grinding wheel may be determined. Likewise the grinding wheel can be also moved toward the other side of the truing tool for an inner truing.

The truing device may be pivotable and an angle of engagement of the truing device with said grinding wheel is adjustable by a pivoting movement of said truing device.

The grinding wheel has a cutting front edge having a contour, with the contour being adjustable by a respective coordination between a depth infeed of the truing device and the radial movement of the grinding wheel. The depth infeed allows for a backward movement of the grinding wheel from the truing roller whereby the eccentricity can be increased when the grinding wheel is pulled somewhat back and then again moved toward the truing tool.

Upon the coordination of the depth infeed and the eccentricity the front edge of the grinding wheel can correspond to the contour of the front edge of, for example, a diamond truing roller so that a tooth base of the bevel gear is obtained.

The pivoting movement and the depth infeed of the truing device may be numerically controlled for generating a correct tooth foot contour.

In accordance with the present invention a grinding machine for grinding pregeared bevel gears is provided, with the grinding machine comprising a stationary machine bed, a workpiece carrier for a bevel gear, a motor driven spindle in the workpiece carrier and holding a bevel to be ground, a motor driven grinding head having a grinding spindle, a grinding wheel on the grinding spindle, and a truing device cooperating with the grinding wheel. The grinding wheel and the bevel gear being ground execute a hobbing motion to generate a shape of a tooth in a direction of the tooth depth, and the grinding wheel defines the shape of the tooth in a longitudinal direction of the tooth, with a cutting motion of a grinding wheel resulting in a metal removal from the pregeared bevel gear being ground. An eccentricity of the grinding spindle to a center of the grinding machine results in a desired angle of the tooth. The truing device is connected to a rigid part of the machine, and is pivotable relative to said grinding wheel for changing an angle of engagement with the grinding wheel. An individual motor is provided for independently driving the truing device, and the grinding head is adjustable by a motor in a radial direction to the bevel gear and also in a direction perpendicular to the radial direction over a limited distance.

By virtue of the features of the grinding machine of the present invention, it is possible to grind pregeared gears with epicycliodes, which, up to the present time, was not possible.

According to the present invention, the truing tool is mounted above the grinding machine on a special frame and, the truing device is rigidly connected to either the machine bed or to another rigid part of the machine, such as, for example a workpiece carrier.

The grinding machine according to the invention makes it possible to correct an angle of engagement of the truing tool with the grinding wheel due to the pivoting motion of the truing device. The truing roller is independently driven so that any coordination between the speed of the grinding wheel and that of the truing tool is possible.

In accordance with further features of the present invention, the truing device includes a truing roller having a central axis 5 with the grinding wheel having a peripheral line parallel to said central axis.

Advantageously, the grinding machine may further include a workpiece carriage and a tool carriage, with the carrier for a bevel gear being mounted on the workpiece carriage, and the grinding head mounted to the tool carriage. A profile of the grinding wheel without high cambering is produced by the truing device upon a linear superposition of a depth infeed of the workpiece carriage and an eccentricity adjustment, e.g. "radial" displacement of the tool carriage.

The truing tool may have a center point for a radius for cambering the grinding wheel, and a high cambering of the grinding wheel is produced when a linear coordination of a depth infeed and the adjustment of said tool carriage is provided, and then a cambering motion of the truing tool is so overlapped that the center point of said radius executes such a curved motion that a desired cambering is brought onto said grinding wheel. The truing tool may be a roller, or an individual diamond or a diamond roller with the straight line flank profile. For example, a corund grinding wheel can be profiled with the aid of the silicon carbide grinding disc. With the aid of the grinding machine of the invention the truing of Borazon in the grinding machine is possible. If the grinding wheel is to be profiled with the diamond roller or the grinding disc, it is expedient that the truing device be pivoted by the pivoting device in accordance with an engagement angle difference between the inner and outer angle of the cutting edge of the grinding wheel. The truing device can be rigidly mounted when, for example the axis of the truing tool extends parallel to the axis of the grinding wheel and a necessary correction is made via the NC-machine control.

The above and additional objects, features, and advantages of the present invention will become more apparent from the following description when taken in connection with the accompanying drawings which show, for the purposes of illustration only, several embodiments in accordance with the present invention.

BRIEF DESCRIPTION OF THE DRAWINGS

FIG. 1a is a partial sectional view through a toothing of the bevel gear of FIG. 1;

DETAILED DESCRIPTION OF THE PREFERRED EMBODIMENTS

Figure 1:
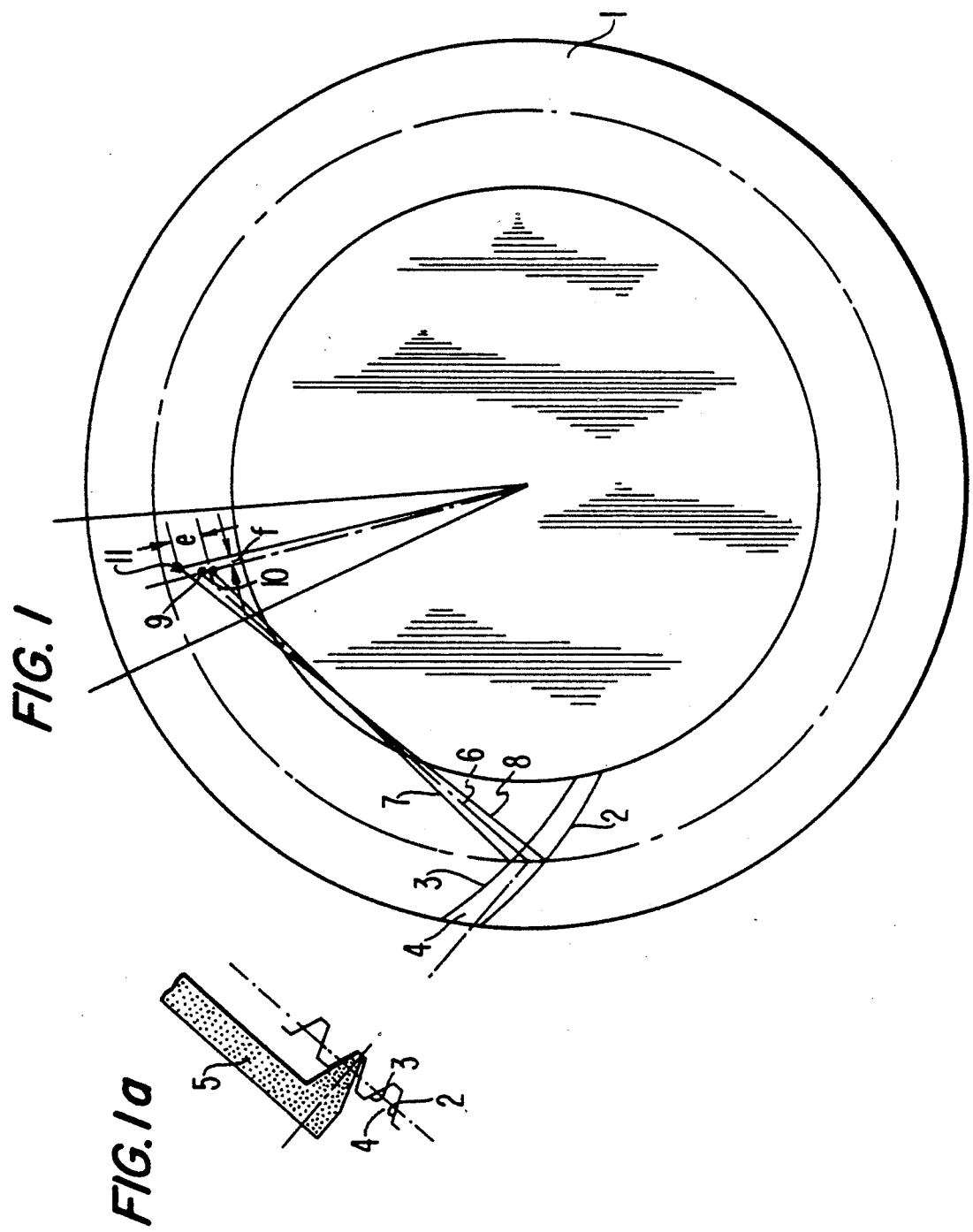
FIG. 1 is a schematic view of a bevel gear in the ideal form of a crown gear according to a geometry of a grinding wheel.

Referring now to the drawings, wherein like reference numerals are used throughout the various views to designate like parts and, more particularly, to FIGS. 1 and 1a, according to these figures, a crown gear 1 includes a toothing is schematically shown by a broken line, with a single tooth shown most clearly in FIG. 1a having a left-hand tooth flank 2 and the right-hand tooth flank 3 and a tooth gap 4 therebetween. Both tooth flanks are generated by a single tool, namely a grinding wheel 5 and only in a single setting, with the gear or workpiece 1 being pregeared by any known methods.

As can be further seen from FIG. 1 the surfaces of the flanks 2 and 3 are constituted by radii, with the reference numeral 6 denoting a median radius with a center point 9, reference character 7 designating an inner radius having a center point 10 and reference numeral 8 designating an outer radius with a center point 11.

A first method in which the left-hand and the right-hand tooth flanks 2 and 3 are to be ground in a single setting includes the step of a continuous oscillation of the tool with the aid of the cyclic additional movement, for example in the path of a cone or an arc sector, continuously between the center points 10 and 11 of the inner radius 7 and outer radius 8.

A further method, in which a single tool 5 is utilized in a single setting to grind the left-hand and the right-hand tooth flanks includes two movements, that is, first a radial movement of the grinding head and the grinding wheel therewith, which is shown by a radial distance "e" in FIG. 1, and then a balancing movement in the direction normal to the radial displacement over the radial distance "e" and designated by a distance "f", which balancing movement can be carried out by a rotation movement of the grinding tool. A portion of the balancing or compensating rotation movement over the distance "f" must be compensated normally to the toothing of the gear; thus, grinding wheel 5 is thinner than the width of the tooth gap 4. Grinding wheel 5 is shown in FIG. 1a in a median position.

Figure 2:
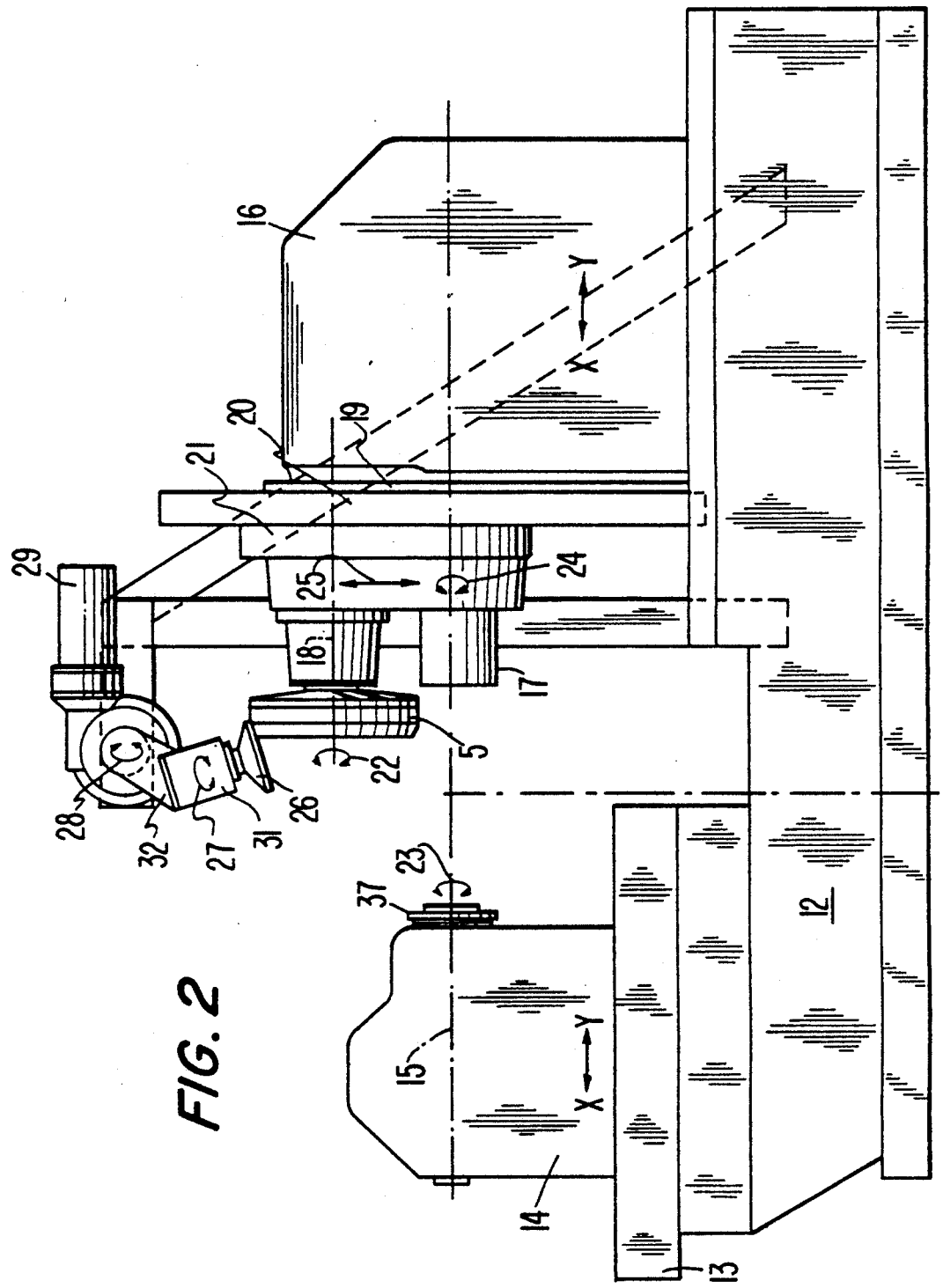
FIG. 2 is a schematic side view of the grinding machine according to the invention.
Figure 3:
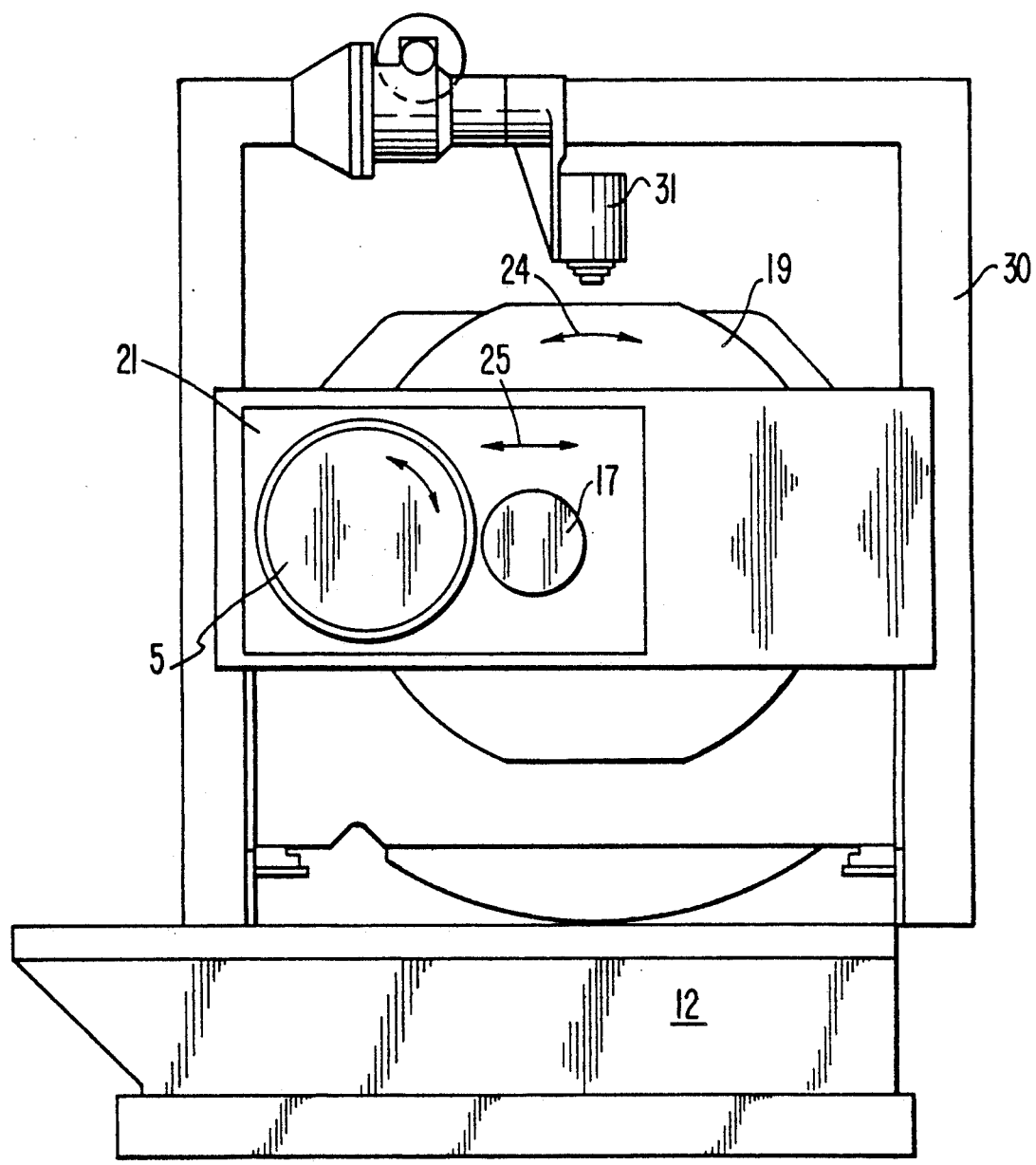
FIG. 3 is a partial front view of the grinding machine of FIG. 2.

With reference to FIGS. 2 and 3, the numerical controlled grinding machine is shown, in the position in which various movements of the grinding tool and of the workpiece can be performed, with the grinding machine including a stationary machine bed 12 and a workpiece carriage 13 with a workpiece carrier 14 adjustable with respect to the machine bed 12 in the direction of arrows X and Y. A workpiece spindle receives a workpiece holder 37.

A tool carrier 16 is arranged on the side of the machine opposite to the workpiece carrier 14. The tool carrier 16 is also adjustable relative to the machine bed 12 in the directions of arrows X and Y. Reference numeral 17 designates a drive motor, whereas, numeral 19 denotes a roller and numeral 20 identifies a carriage guide for the tool carrier 16. A grinding carriage 21 is driven by the motor 17. Arrow 22 indicates a working motion of the grinding wheel 5, and arrows 23 and 24 indicate hobbing movements. A double-headed arrow 25 indicates the eccentricity adjustment of the grinding head. A double-headed arrow 27 shows the directions of moving of a truing tool 26, whereas, a double-headed arrow 28 illustrates the direction of pivoting movement of the truing tool 26 about a horizontal axis which is shown by a dashed center line. Pivoting movement of truing tool 26 in the directions of arrow 28 is provided by means of a drive motor 29.

The whole truing device is immovably connected to the machine bed 12 by a support frame 30. The motor 31 for driving the truing device 26 is arranged in a housing mounted on frame 30.

The grinding machine of FIGS. 2 and 3 first allows the generation of the circularly toothed bevel gear in a hobbing process. The workpiece, not illustrated in FIGS. 2 and 3, and is a pregeared bevel gear, is secured in the workpiece holder 37, whereas, grinding wheel 5 is mounted to the roller 19 of the tool carrier. The grinding wheel 5 and the workpiece carry out a hobbing motion with the aid of which a tooth form in the direction of tooth depth is generated. The hobbing motion and all secondary movements are numerically controlled in the grinding machine illustrated in FIGS. 2 and 3 so that a mechanical transmission train with this grinding machine is not required. The balancing or compensating rotation "f" shown in FIG. 1 and the displacement over the radial distance "e" in this grinding machine with the multiple control are so performed that the displacement over the radial distance "e" can be carried out with a higher accuracy and in shorter periods of time between the shiftings from the forward hobbing to the backward hobbing.

The truing device 27 has an arm 32 connecting this device to the drive motor 29. Arm 32, by drive motor 29, pivots in the directions shown by double-headed arrow 28 and can be correspondingly locked in any desired pivoted position. Upon changing of the angle of pivoting, the angle of meshing or gearing of the grinding wheel 5 can be corrected. Since the motor 31 corresponds to the truing tool 26 selected for the grinding wheel 5 any arrangement of the speed of the grinding wheel 5 and the speed of the truing tool 26 is possible. The grinding wheel 5 is moved toward the truing tool formed as a truing roller via the aforementioned radial distance "e" so that a radius of the grinding wheel is determined. The grinding wheel 5 is also moved for an inner truing to another side of the truing tool 26. The depth feed is carried out by moving the grinding wheel backward away from the truing tool 26 so that the radial distance "e" can be enhanced when the grinding wheel 5 is again pulled back for the truing operation and is then again moved forward. Upon the coordination of the depth infeed and radial distance "e", the front edge of the grinding wheel 5 can have a contour corresponding to that of the front edge of the truing tool, for example, a diamond truing roller 26, so that the tooth base of the bevel gear being ground is assured.

If desired the pivoting movement 28 of the truing device 27 and the depth infeed can be carried out in the numerically controlled grinding machine so that the tooth foot contour will be generated with a greater accuracy, quickly and without any problem.

Figure 4:
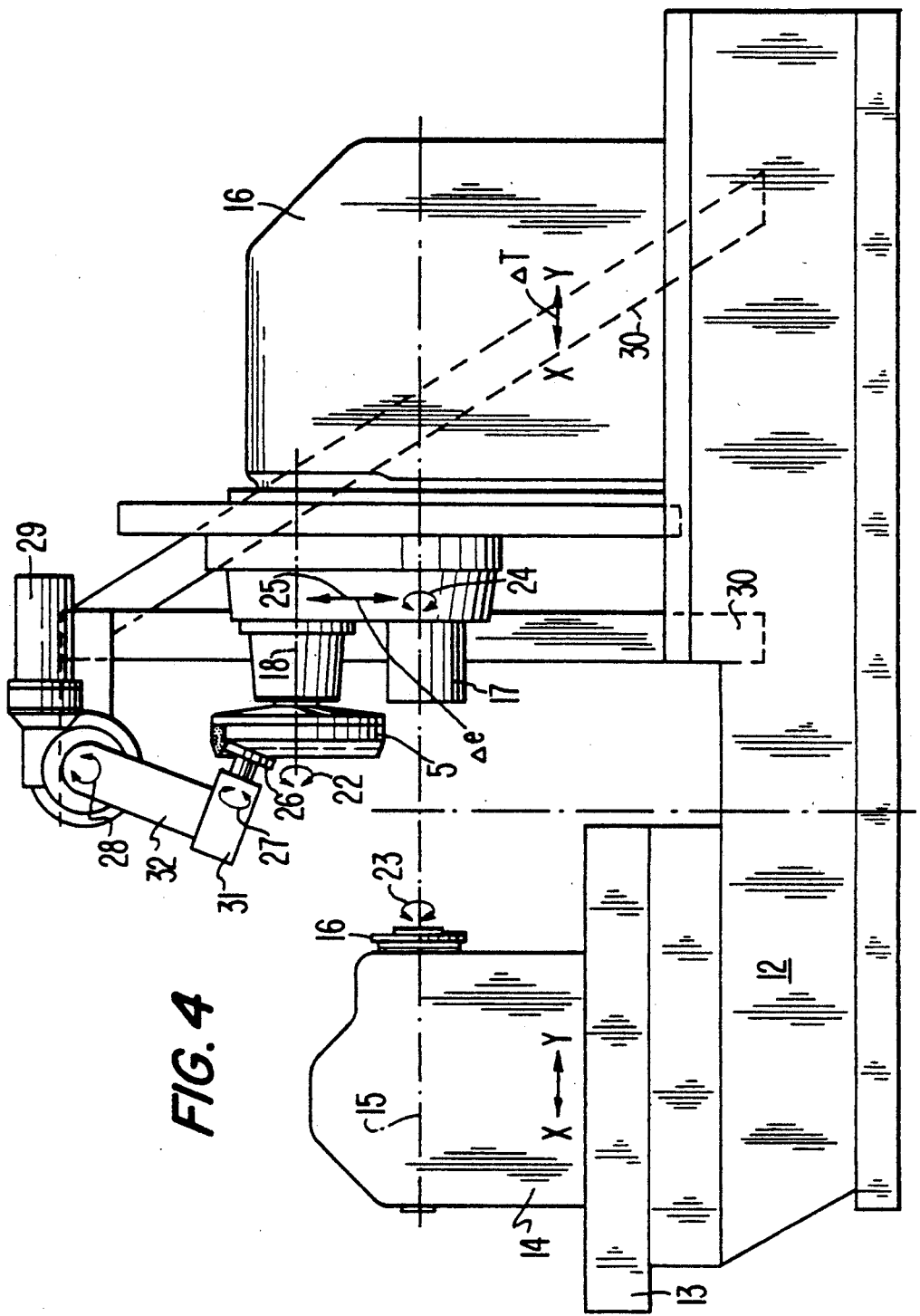
FIG. 4 is a schematic side view of the grinding machine according to a modified embodiment of the invention.
Figure 5:
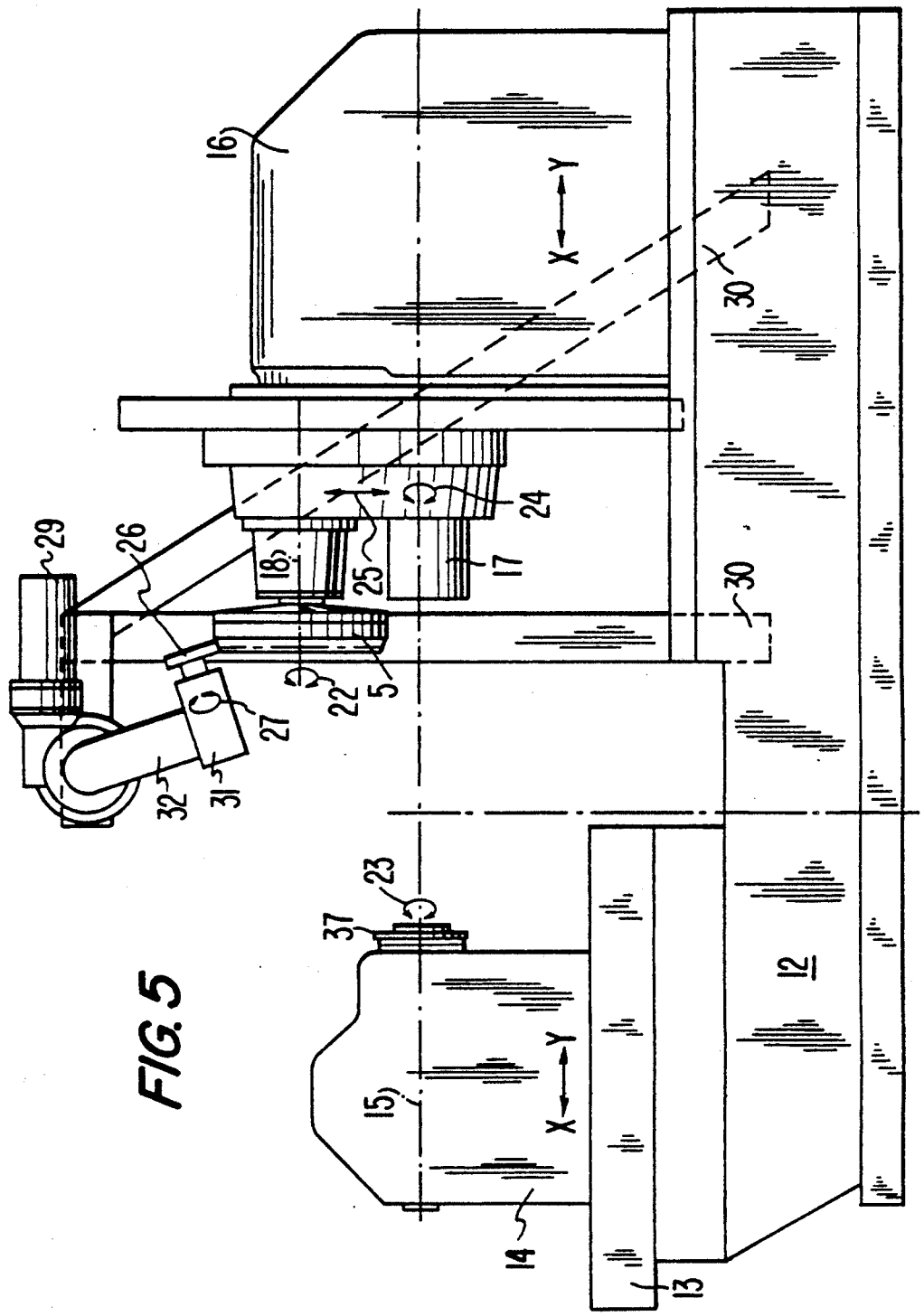
FIG. 5 is a schematic side view of the grinding machine of another arrangement of a truing tool.
Figure 6:
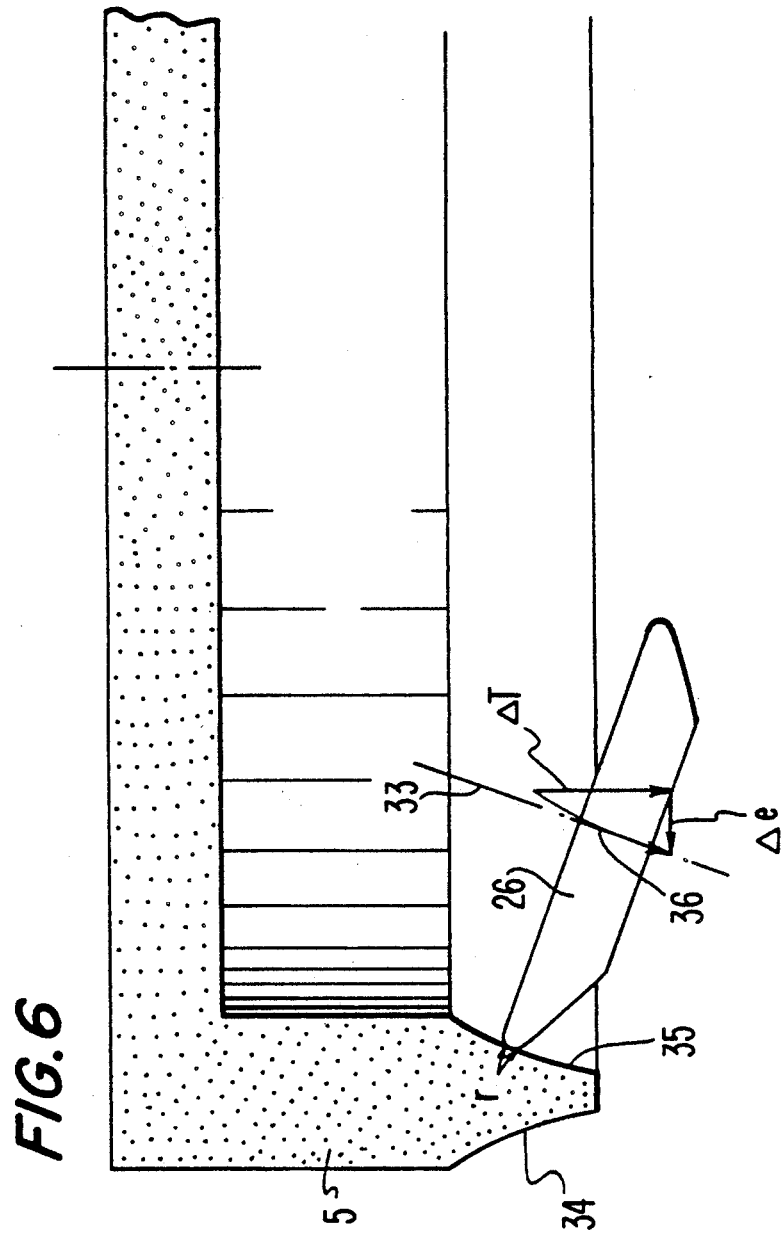
FIG. 6 is a view illustrating a truing of a corund grinding wheel with the aid of a diamond truing roller.

Due to the arrangement of the machine axes and the truing tool 26 outside the carriage 21 and stationarily by the rigid connection of frame 30 to machine bed 12 a further possibility of the truing of the grinding wheel 5 can be seen from FIGS. 4 to 7. This possibility occurs when a known cup-shape grinding wheel is employed in place of the hollow conical grinding wheel; the machine control is possible with the cup-shaped grinding wheel. It is suitable in this case to arrange the axis of the truing tool 26 as shown in FIGS. 4 and 5. The truing tool 26 does not require a contour with a high bulging but can, in an extreme case, be a single diamond (not shown). Since a single diamond is always subject to a very strong wear, as shown in FIG. 6, the truing tool or roller 26, covered with a diamond coating. The central axis 33 of the truing tool or roller 26 can extend parallel to the angular edge of grinding wheel 5. The angle of inclination of the truing tool or roller 26 depends on given conditions of the operation.

With reference to FIG. 4 it can be seen that the truing process of profiling the inner cone of the grinding wheel 5 is illustrated whereas a positioning of the truing tool or roller 26 for profiling the outer cone of the grinding wheel 5 is shown in FIG. 5.

In a simple case, the profile of the grinding wheel without high bulging or cambering is generated by a linear superposition of the depth infeed $\Delta T$ of the tool carrier 16 and the eccentricity adjustment $\Delta e$ of the carriage 21 as shown in FIG. 6. The radius of the diamond coated truing tool or roller 26 is denoted by "r", whereas, the edge side surfaces of the grinding wheel having a high bulging or cambering are denoted by reference numerals 34 and 35. Vector 36 identifies a truing stroke. Thick lines identify the diamond coating.

According to the invention, the diamond tool or roller 26 with straight line flanks can profile a corund wheel or a Borazon wheel with the aid of a silicon carbide grinding disc, which is polished during the truing operation and must be respectively followed up. The truing operation of Borazon is possible inside the grinding machine for grinding bevel gears. If the profiling takes place with the diamond or the grinding disc, it is expedient to pivot the truing tool 26 with the aid of the pivoting device in accordance with an engagement angle difference between the inner cone 35 and the outer cone 34 of the grinding wheel during the truing of the inner and outer cones. The truing tool or roller 26 can be also stationary when, for example, the axis of truing tool or roller 26 extends parallel to the axis 18 of the grinding wheel and then a respective correction via the numerical machine control should be carried out.

If the grinding wheel is profiled with a single diamond or with the diamond truing roller so that the high bulging can be produced on the edges of the grinding wheel 5 and a linear coordination of the depth infeed $\Delta T$ and the carriage adjustment $\Delta e$ is produced and a bulging or cambering of the edges is so superposed that the central point of the radius of the diamond truing tool or roller 26 or the cutting edge of the single diamond execute a curved motion in such a form that a desired bulging or cambering is generated on the side edges 34 and 35 of the grinding wheel 5.

Figure 7:
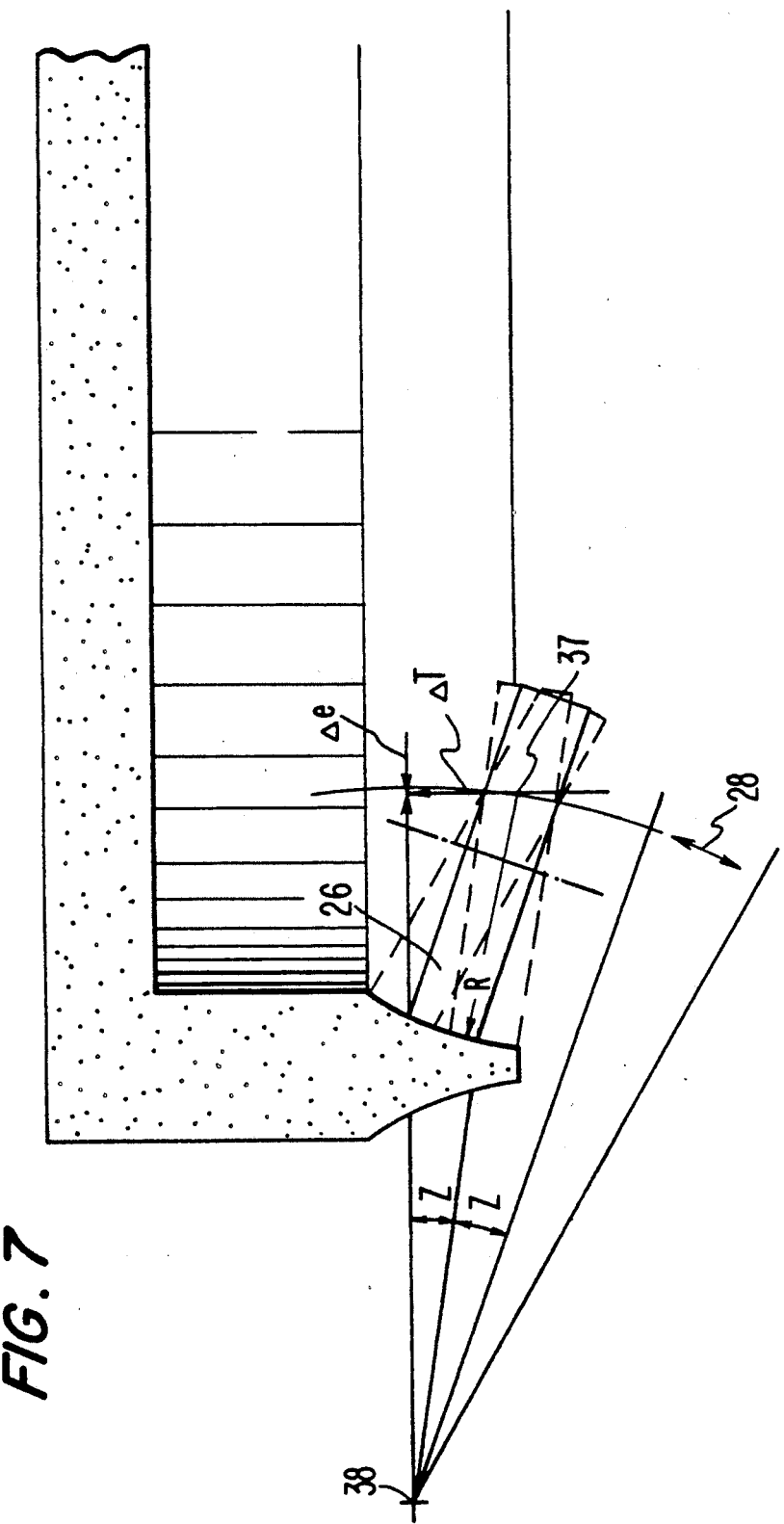
FIG. 7 is a view showing a truing of a Borazon grinding wheel by a silicon carbide grinding disc.

During the truing of the Borazon grinding wheel with the aid of the silicon carbide grinding disc a motion as shown in FIG. 7 is possible. The truing wheel or disc 26 is pivoted about a pivot point 37 whereby the radius of the pivoting movement is shortened. Truing radii R from 200 to 3,200 mm are desired on the grinding wheel 5 according to a module and desired camberring. Radius R is variable depending upon the task of the truing. Therefore, the pivot point 37 of the truing tool 26 can not lie below the pivot point of the truing motion. Furthermore, such a device can be hardly employed within the machine for collision reasons. This motion, however, can be generated by the use of the pivoting device of FIG. 4 and the use of this device in the grinding machine produces controlled motions ΔT and Δe. The truing tool is pivoted about the pivot axis 38 about angles z in the both opposite directions of arrow 28, whereby a position of the pivot point 38 of the truing motion relative to the grinding wheel 5 remains the same as if the tool carrier is moved rearwardly a distance ΔT and the carriage 21 will follow this movement the distance Δe. Thus, the pivot point 37 of the truing motion will remain in the same position relative to the grinding wheel 5, and the truing disc 26, due to superposing of these three motions, will make a pivoting motion relative to the grinding wheel 5 thereby producing a cambering or bulging radius R. Due to the oscillation of the truing disc about the pivoting point 37 relative to the grinding wheel 5, a desired bulging is also produced on the Borazon grinding wheel 5. Wear of the truing disc 26 as well as all other above described motions can be controlled in the numerical machine control with high precision.

It will be understood that each of the elements described above, or two or more together, may also find a useful application in other types of grinding machines differing from the types described above.

While I have shown and described several embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A grinding machine for grinding pregeared bevel gears, the grinding machine comprising a stationary machine bed, a workpiece carrier for a bevel gear, a motor driven spindle in said carrier and holding a bevel gear to be ground, a motor driven grinding head having a grinding spindle, a grinding wheel on said grinding spindle, a truing device connected to a rigid part of the machine and cooperating with said grinding wheel, said truing device being pivotable relative to said grinding wheel for changing an angle of engagement with said grinding wheel, said grinding wheel and the bevel gear being ground cooperating with one another to execute a hobbing motion to generate a shape of a tooth in a direction of a tooth depth, said grinding wheel defines a shape of the tooth in a longitudinal direction of the tooth and a cutting motion of said grinding wheel results in a metal removal from the pregeared bevel gear being ground, and an eccentricity of the grinding spindle to a center of the grinding machine results in a desired angle of the tooth an individual motor drive means for independent driving said truing device, and, wherein said grinding is adjustable by a motor in a radial direction to said bevel gear and also in a direction perpendicular to said radial direction over a limited distance.

2. The machine as defined in claim 1, wherein the rigid part is said machine bed.

3. The machine as defined in claim 1, wherein said rigid part is said workpiece carrier.

4. The machine as defined in claim 1, wherein said truing device includes a truing roller having a central axis, and wherein said grinding wheel has a peripheral line parallel to said central axis of said truing roller.

5. The machine as defined in claim 1, further comprising a workpiece carriage and a tool carriage, said workpiece carrier for a bevel gear being mounted on said workpiece carriage, said grinding head being mounted to said tool carriage, and wherein a profile of the grinding wheel without high cambering is produced by said truing device upon a linear superposition of a depth infeed of said workpiece carriage and an eccentricity adjustment of said tool carriage.

6. The machine as defined in claim 5, wherein said truing device includes a truing tool having a center point for a radius for cambering said grinding wheel, and wherein a high cambering of the grinding wheel is produced when a linear coordination of a depth infeed and the adjustment of said tool carriage is provided and then a cambering motion of the truing tool is so overlapped that a center point of said radius executes such a curved motion that a desired cambering is brought onto said grinding wheel.

7. The machine as defined in claim 6, wherein said truing tool is a truing roller.

8. The machine as defined in claim 6, wherein said truing tool includes a diamond coated roller.

9. The machine as defined in claim 6, wherein said truing tool includes an individual diamond having cutting edges.

10. The machine as defined in claim 6, wherein said truing tool is a truing disc, and wherein relative motions of the grinding wheel and the truing disc correspond to a pivoting of the truing disc about said center point.

11. The machine as defined in claim 10, wherein said tool carriage is displaceable toward and away from said grinding wheel, and wherein said tool carrier is moved back a predetermined distance and said tool carriage is reset a predetermined distance.

* * * * *